Feb. 8, 1944.    L. C. LUDBROOK    2,341,280
ELECTRIC CONTROL CIRCUIT
Filed Sept. 18, 1942
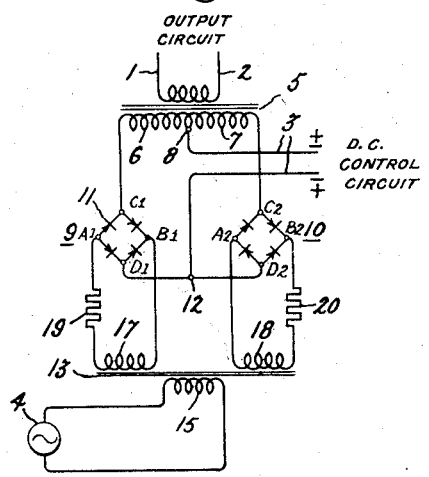
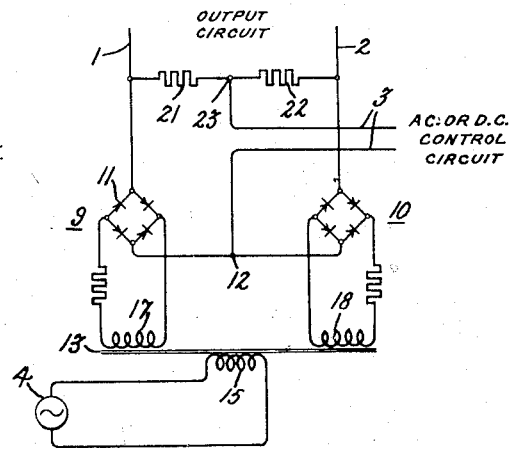
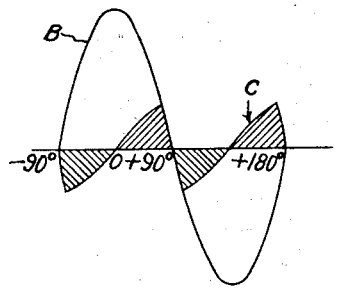
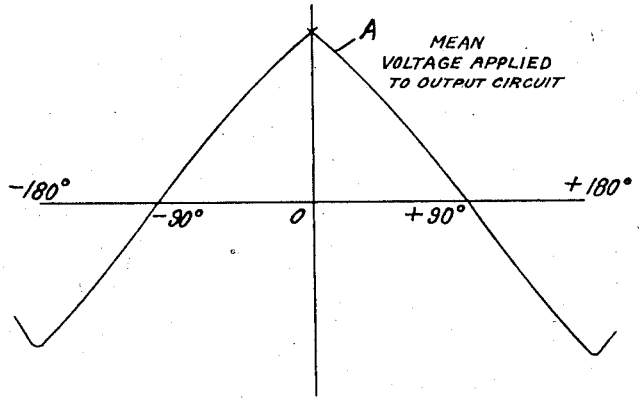
Inventor:
Leslie C. Ludbrook.
by Harry E. Dunham
His Attorney.

Patented Feb. 8, 1944

2,341,280

UNITED STATES PATENT OFFICE 2,341,280

ELECTRIC CONTROL CIRCUIT

Leslie C. Ludbrook, near Rugby, England, assignor to General Electric Company, a corporation of New York Application September 18, 1942, Serial No. 458,785
In Great Britain December 12, 1940

6 Claims. (Cl. 172—238)

My invention relates to electric control circuits and more particularly to systems for controlling the energization of an output circuit in response to a control voltage.

This application is a continuation in part of my copending patent application Serial No. 418,795, filed November 12, 1941, entitled "Electric control circuits," which has issued as Patent No. 2,316,008, dated April 6, 1943, and which is assigned to the assignee of the present application.

It is an object of my invention to provide new and improved electric control circuits.

It is another object of my invention to provide new and improved control circuits wherein the phase and magnitude of the voltage impressed on an output circuit is controlled in response to the energization of a control circuit, and in which the system is arranged to have sufficient impedance so that the control voltage may vary throughout a substantial range without causing the flow of excessive current which would tend to decrease the sensitivity of the system.

It is a further object of my invention to provide a new and improved control circuit wherein the magnitude and polarity of the mean voltage impressed on the output circuit is controlled in response to the phase difference between the voltages of two alternating current circuits.

Briefly stated, in the illustrated embodiments of my invention I provide control circuits which are improvements upon control circuits disclosed and claimed in my above-identified copending patent application. In addition, I provide a new and improved circuit for controlling the magnitude and polarity of the voltage impressed on an output circuit in response to the phase difference between the voltage of an alternating current source and the voltage of an alternating current control circuit.

For a better understanding of my invention, reference may be had to the following description taken in connection with the accompanying drawing, and its scope will be pointed out in the appended claims. Fig. 1 diagrammatically illustrates an improved arrangement wherein the shunt impedance to the flow of the control current is maintained at a relatively high value, thereby placing a limitation on the magnitude of the control current which is shunted through the control system even though the control potential varies throughout a relatively large range. Fig. 2 diagrammatically illustrates another embodiment of my invention which may be used to control the energization of an output circuit in response to variations in control potential provided by either an alternating current control circuit or a direct current control circuit. Figs. 3 and 4 represent certain operating characteristics of the arrangement shown in Fig. 1 when the system is operating to control the magnitude and polarity of the voltage supplied to the output circuit in response to variations in phase between the voltage of an alternating current source and the voltage of an alternating current control circuit.

Referring now to Fig. 1 of the drawing, I have there illustrated my invention as applied to a system for controlling the energization of an output circuit, comprising conductors 1 and 2, in response to the polarity and magnitude of the voltage of a control circuit 3. Control circuit 3 may supply a unidirectional voltage, or a control voltage of variable magnitude and reversible polarity.

In order to control the phase and magnitude of the voltage supplied to the output circuit 2 with respect to the voltage of an alternating current source 4, I provide means which comprises a pair of electric circuits or branches which selectively energise a pair of impedance elements. The impedance elements may be provided by means of a transformer 5 which comprises a pair of primary winding sections 6 and 7 having an electrically intermediate connection 8.

The pair of electric circuits which selectively energize the primary winding sections 6 and 7 comprise rectifiers 9 and 10. The rectifiers 9 and 10 may be connected as conventional bridge fullwave type rectifiers and each includes a plurality of unidirectional conducting devices or rectifiers 11 which may be of the dry type such as copperoxide rectifiers or the equivalent thereof. Of course, the rectifiers 11 may be electric discharge devices which conduct current in the desired direction when properly poled. The control circuit 3 is connected between the common juncture 12 of the rectifiers 9 and 10 and the electrically intermediate connection 8 of the primary winding sections 6 and 7.

Rectifiers 9 and 10 are energized from the alternating current source 4 through transformer 13. Transformer 13 is provided with two secondary windings 17 and 18 which are connected to diametric terminals of the bridge networks of rectifiers 9 and 10 through resistances 19 and 20, respectively. Secondary windings 17 and 18 each develop a peak voltage greater than twice the maximum D. C. control voltage delivered by control source 3. Polarity of secondary windings 17 and 18 is such that rectifiers 9 and 10 conduct on alternate half cycles of voltage from alternating current source 4. Resistors 19 and 20 determine the currents passed by rectifiers 9 and 10 on their conducting half cycles, the peak values of these currents being made greater than the maximum current to be delivered from control circuit 3 to the output circuit 1—2. In this manner, even though the voltage of control circuit 3 varies throughout a substantial range, the efficiency of power transmission from control circuit 3 to output circuit 1—2, remains constant at a high value.

The operation of the embodiment of my invention shown in Fig. 1 will be explained by considering the system when it is operating to control the phase and magnitude of the voltage supplied to the output circuit, including conductors 1 and 2, in response to the polarity and magnitude of the voltage of control circuit 3. The individual arms of rectifier bridges 9 and 10 are assumed to have equal low and constant forward resistances, and substantially infinite reverse resistances. Rectifiers 9 and 10 are therefore balanced Wheatstone bridge circuits, and the voltages developed between points A and B, by the alternating current circuit 4, do not appear at the diametrically opposite points C and D. Consider the half cycle of voltage from alternating current source 4, which makes point $A_1$ positive and $A_2$ negative, and assume zero voltage from control source 3. Then the arms of bridge 9 carry forward "bias" currents, and inverse "bias" voltages are developed across the arms of bridge 10. A voltage applied from control circuit 3 causes current flow between terminals $C_1$ and $D_1$ to the output winding 6, the current dividing equally between the paths $C_1A_1D_1$, and $C_1B_1D_1$, bucking and boosting the "bias" currents. Since the "bias" current exceeds the control current, all four arms carry net forward current and remain of low resistance. No current flows between terminals $C_2D_2$ since the inverse "bias" voltage exceeds the applied control voltage. On the next half cycle of voltage from alternating current source 4, the functions of rectifier bridges 9 and 10 are interchanged and output winding 7 is connected to the control source, in place of output winding 6.

With sine wave "bias" from alternating current source 4, and direct current control voltage, the output circuit receives truncated sine wave excitation. The magnitude of output is proportional to the magnitude of control current, and the fundamental output component undergoes 180° phase shift with respect to alternating current source 4, when the polarity of control voltage is reversed.

In Fig. 2 I have diagrammatically illustrated another embodiment of my invention which is similar in several respects to that shown in Fig. 1 and corresponding elements have been assigned like reference numerals. In the arrangement of Fig. 2, instead of employing a transformer connected to the output circuit, I provide a pair of impedance elements, such as resistors 21 and 22, having a common juncture or connection 23 which is connected to the control circuit 3.

The arrangement of Fig. 2 is capable of operation in two separate manners. The system of Fig. 2 may control the phase of the voltage supplied to the output circuit in response to variations in polarity of the control circuit 3 where the control circuit 3 is a control circuit of reversible polarity. In addition, the arrangement of Fig. 2 may be operated to supply to the output circuit a voltage of variable magnitude and reversible polarity, and which is a function of the phase difference between the voltage of source 4 and an alternating voltage supplied to control circuit 3.

Concerning the first type of operation mentioned above, the arrangement of Fig. 2 operates in substantially the same way as that explained above in connection with the arrangement of Fig. 1. That is, where a reversible polarity voltage is applied to control circuit 3, the phase of the voltage supplied to the output circuit with respect to the voltage of source 4 is varied in response to the control voltage.

The operation of the embodiment of my invention shown in Fig. 2 will now be considered when it is functioning to supply to the output circuit comprising conductors 1 and 2 a voltage of variable magnitude and reversible polarity in response to the phase difference between the alternating voltage supplied to control circuit 3 and the alternating voltage of source 4. When the voltage of the control circuit 3 and the voltage of source 4 are in phase, the voltage applied to the output circuit is a maximum. The magnitude of the mean voltage impressed on the output circuit progressively decreases as the phase difference between the control voltage of circuit 3 and the voltage of source 4 increases. This relationship obtains for phase displacement in either direction between these two voltages. The mean voltage impressed on the output circuit is zero when a 90 electrical degree phase displacement obtains between the voltage of circuit 3 and the voltage of the source 4. Upon a further relative phase change, the polarity of the mean voltage supplied to the output circuit reverses and thereafter reaches a maximum negative value when the voltage of circuit 3 and the voltage of source 4 are displaced 180 electrical degrees.

The operation of the embodiment of my invention shown in Fig. 2 may be more fully appreciated by referring to the operating characteristics shown in Fig. 3, wherein the curve A represents the voltage applied to the output circuit. It will be noted that as the phase difference between the voltage of control circuit 3 and the source 4 increases from zero to the 90 electrical degree position in either the leading or the lagging phase relationship, the voltage applied to the output circuit progressively decreases. At the 90 electrical degree points, the output voltage is zero. Between the 90 and 180 electrical degree phase positions, the polarity of the voltage applied to the output circuit reverses.

Although the embodiment of the arrangement shown in Fig. 2 may be arranged so that the characteristic curve on the one or the other side of the in-phase position is utilized, the preferred normal condition may be obtained when the potentials of control circuit 3 and the source 4 are displaced 90 electrical degrees. For this condition of operation, a reversal of polarity of the voltage applied to the output circuit is then obtained when the phase relation between the two voltages changes in either direction.

Fig. 4 illustrates diagrammatically the operation of the system when it is arranged to produce a reversal in polarity of the voltage supplied to the output circuit when the system is operating the neighbourhood of the 90 electrical degree phase position. Curve B represents the "bias" supplied by alternating current source 4, and curve C the resultant voltage supplied from control source 3, to output circuit 1—2. The mean output voltage is proportional to the difference between the positive and negative shaded areas, and varies with phase shift according to the curve of Fig. 3.

While I have shown and described my invention as applied to particular systems of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a control circuit for supplying a voltage of reversible polarity, an alternating current output circuit, a source of alternating current, and means for controlling the phase and magnitude of the voltage of said output circuit relative to the voltage of said source in response to the polarity and magnitude voltage of said control circuit and comprising a pair of impedance elements having an intermediate connection, said impedance elements being connected to said output circuit, a pair of electric circuits each including a rectifier and each connected to a different one of said impedance elements and a transformer energized from said source and carrying two secondary windings each connected through a resistance to a different one of said rectifiers.

2. In combination, a control circuit for supplying a voltage of reversible polarity, an alternating current output circuit, means for producing an alternating voltage, and means for controlling the phase and magnitude of the voltage of said output circuit relative to said last-mentioned voltage and in response to the polarity and magnitude of the voltage of said control circuit and comprising transforming means having a pair of primary winding sections, a pair of electric circuits each including a rectifier and each connected to a different one of said primary winding sections and a transformer energized from said first-mentioned means carrying two secondary windings each connected to a different one of said rectifiers through a resistance.

3. In combination, a control circuit for supplying a voltage of reversible polarity, an alternating current output circuit, a source of alternating current, and means for controlling the phase and magnitude of the voltage impressed on said output circuit with respect to the voltage of said source and in response to the polarity and magnitude of the voltage of said control circuit and comprising transforming means including a pair of primary winding sections and having an electrical intermediate connection, a pair of electric circuits for selectively energizing said primary winding sections in response to the voltage of said control circuit and each comprising a rectifier, said control circuit being connected between said intermediate connection and a common juncture of said rectifiers, and a transformer energized from said source, and carrying two secondary windings connected through resistances to the input circuits of said rectifiers.

4. In combination, a control circuit for supplying a voltage of reversible polarity, an alternating current output circuit, a source of alternating current, and means for controlling the phase and magnitude of the voltage impressed on said output circuit with respect to the voltage of said source and in response to the polarity and magnitude of the voltage of said control circuit and comprising transforming means including a pair of primary winding sections having an intermediate connection, a pair of electric circuits for controlling the flow of current through the primary winding sections in response to the voltage of said control circuit each comprising a bridge-type rectifier, said control circuit being connected between said intermediate connection and a common juncture of said rectifiers, and a transformer energized from said source carrying two secondary windings each connected through a resistance to a different one of said rectifiers.

5. In combination, a source of alternating current, an alternating current control circuit, an output circuit, a pair of serially connected impedances connected across said output circuit and having an intermediate connection, and means for controlling the magnitude and polarity of the voltage applied to said output circuit in response to the difference in phase between the voltage of said source and the voltage of said control circuit and comprising a pair of electric circuits each including a rectifier and each connected to a different one of said impedance elements, said control circuit being connected between said intermediate connection of said impedance elements and a common juncture of said rectifiers, and a transformer energized from said source carrying two secondary windings each connected through a resistance to a different one of said rectifiers.

6. In combination, a source of alternating current, an alternating current control circuit, an output circuit, a pair of serially connected resistances connected across said output circuit and having an intermediate connection, and means for controlling the magnitude and polarity of the voltage applied to said output circuit in response to the difference in phase between the voltage of said source and the voltage of said control circuit and comprising a pair of electric circuits each including a bridge-connected rectifier and each connected to a different one of said resistances, said control circuit being connected between said intermediate connection and a common juncture of said rectifiers, and a transformer energized from said source carrying two secondary windings each connected through a resistance to a different one of said rectifiers.

LESLIE C. LUDBROOK.